(12) United States Patent
Baker-Ostiguy et al.

(10) Patent No.: US 11,549,443 B2
(45) Date of Patent: Jan. 10, 2023

(54) SEALING ARRANGEMENT WITH VENT FOR AN ENGINE COMPONENT WITH A SERVICE PORT

(71) Applicant: PRATT & WHITNEY CANADA CORP., Longueuil (CA)

(72) Inventors: Simon Baker-Ostiguy, Montreal (CA); Pierre Gauvin, St-Bruno-de-Montarville (CA); Herve Turcotte, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 176 days.

(21) Appl. No.: 17/006,214

(22) Filed: Aug. 28, 2020

(65) Prior Publication Data

US 2022/0065170 A1 Mar. 3, 2022

(51) Int. Cl.
*F02C 7/28* (2006.01)
*F02C 7/06* (2006.01)
*F02C 7/32* (2006.01)

(52) U.S. Cl.
CPC ............ *F02C 7/28* (2013.01); *F02C 7/06* (2013.01); *F02C 7/32* (2013.01); *F05D 2220/323* (2013.01); *F05D 2240/55* (2013.01); *F05D 2240/60* (2013.01); *F05D 2250/141* (2013.01); *F05D 2260/98* (2013.01)

(58) Field of Classification Search
None
See application file for complete search history.

(56) References Cited

U.S. PATENT DOCUMENTS

| | | | | |
|---|---|---|---|---|
| 3,844,688 A * | 10/1974 | Bulkley | .............. | F04B 39/04 417/313 |
| 4,699,095 A * | 10/1987 | Klie | .............. | F02N 7/08 74/7 A |
| 5,024,449 A | 6/1991 | Otto | | |
| 5,028,205 A * | 7/1991 | Kapadia | .............. | F16J 15/004 415/230 |
| 5,813,829 A | 9/1998 | Mazzotta | | |
| 6,244,600 B1 | 6/2001 | Leturcq | | |
| 6,334,422 B1 | 1/2002 | Sumi et al. | | |
| 6,390,072 B1 | 5/2002 | Breeden | | |
| 7,137,590 B2 | 11/2006 | Sandrart et al. | | |
| 8,714,941 B2 * | 5/2014 | Ruffer | .............. | F04B 39/16 417/313 |
| 9,062,675 B2 | 6/2015 | Dixon et al. | | |
| 10,502,141 B2 * | 12/2019 | Logan | .............. | F01D 25/16 |

(Continued)

FOREIGN PATENT DOCUMENTS

FR 2986569 8/2013

*Primary Examiner* — Kayla Mccaffrey
(74) *Attorney, Agent, or Firm* — Norton Rose Fulbright Canada LLP (57) ABSTRACT

An apparatus of an aircraft engine having lubricated moving components is provided. The apparatus comprises a housing having a lubricant cavity for receiving lubricant and a service port cavity, the housing defining a selectively openable service port for accessing the service port cavity. A shaft is mounted for rotation about a rotational axis to the housing. A seal is mounted about the shaft forming a partition between the lubricant cavity and the service port cavity. A vent channel extends between the lubricant cavity and the service port cavity.

9 Claims, 9 Drawing Sheets

(56) References Cited

U.S. PATENT DOCUMENTS

| | | | |
|---|---|---|---|
| 2009/0120098 A1* | 5/2009 | Avila | F01D 25/18 60/778 |
| 2015/0010420 A1* | 1/2015 | Oda | F04C 14/28 418/166 |
| 2018/0195437 A1* | 7/2018 | Stephan | F02C 7/06 |

* cited by examiner

SEALING ARRANGEMENT WITH VENT FOR AN ENGINE COMPONENT WITH A SERVICE PORT

TECHNICAL FIELD

The application generally relates to components of aircraft engines and, more particularly, engine components with a service port and to sealing arrangements for such engine components.

BACKGROUND OF THE ART

Aircraft engines, such as gas turbine engines, include a lubrication system for distributing a lubricating fluid, such as oil for instance, to portions of the engine. Aircraft engines may require maintenance over time. Access to internal cavities of components of the aircraft engines, such as pumps, gearboxes or other components during maintenance or inspection may be cumbersome, as contaminants may enter such internal cavities during maintenance and mix with the lubricants, for instance when a service port of the engine component is opened during maintenance/inspection. This may be detrimental to the performance of the engine and/or engine components.

SUMMARY

In one aspect, there is provided an apparatus of an aircraft engine having lubricated moving components, the apparatus comprising: a housing having a lubricant cavity for receiving lubricant and a service port cavity, the housing defining a selectively openable service port for accessing the service port cavity; a shaft mounted for rotation about a rotational axis to the housing; a seal mounted about the shaft forming a partition between the lubricant cavity and the service port cavity; and a vent channel extending between the lubricant cavity and the service port cavity.

In another aspect, there is provided an apparatus for an aircraft engine, comprising: a housing; a shaft rotatably supported for rotation about a rotation axis within the housing; a seal mounted about the shaft and interfaced to the shaft, the seal having a first side and a second side; a lubricant drain cavity on the first side of the seal, the lubricant drain cavity adapted to receive lubricant from a lubricated moving interface of the apparatus; an access port cavity on the second side of the seal; a vent channel extending between the lubricant drain cavity and the access port cavity for fluid flow communication between the lubricant drain cavity and the access port cavity so as to balance air pressure across the seal; and a cranking feature in the shaft, the cranking feature accessible via the access port cavity.

DESCRIPTION OF THE DRAWINGS

Reference is now made to the accompanying figures in which.

DETAILED DESCRIPTION

Figure 1:
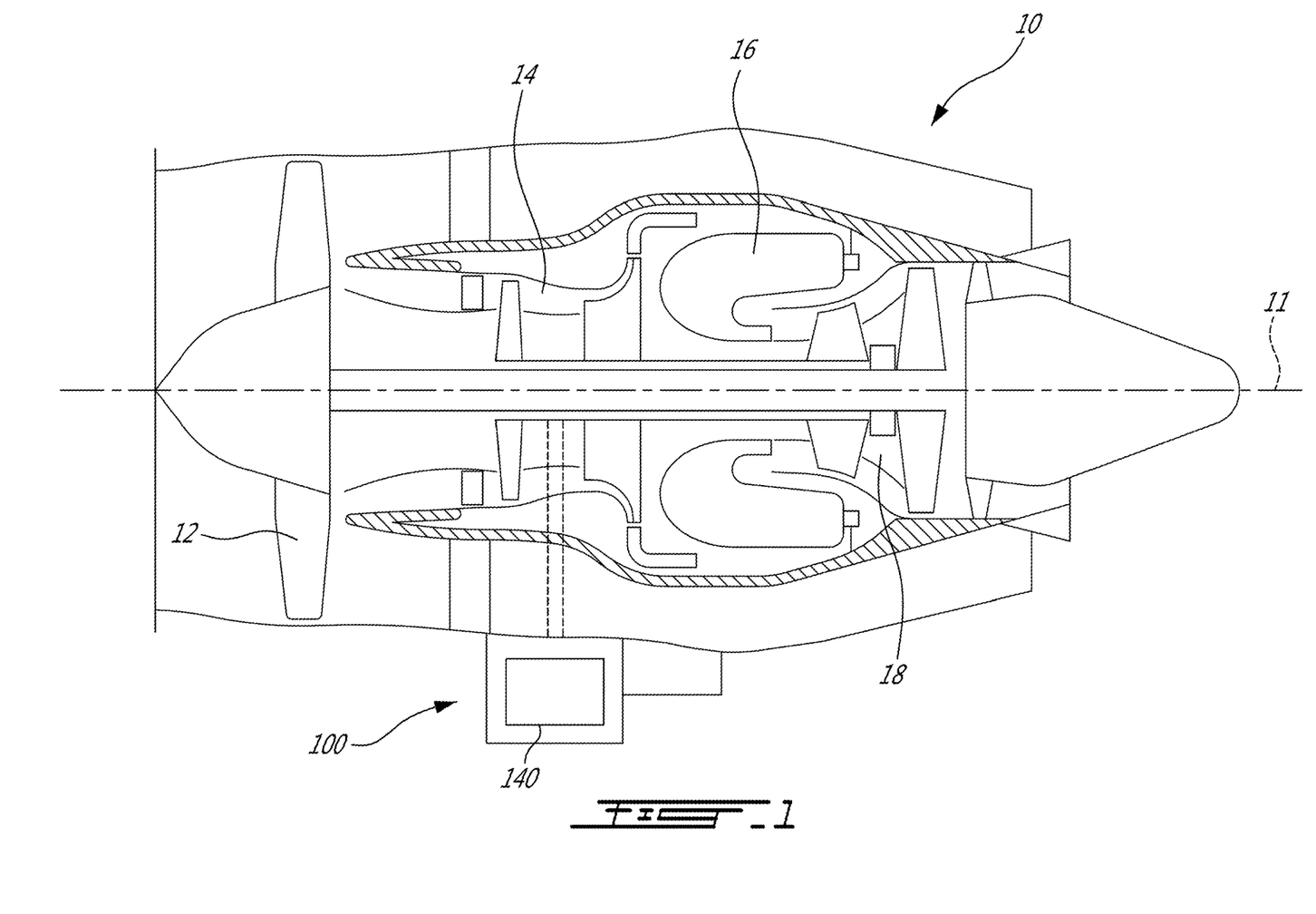
FIG. 1 is a schematic cross sectional view of an aircraft engine provided in the form of a gas turbine engine with a lubrication system.

FIG. 1 illustrates an aircraft engine 10 as an example, such as a gas turbine engine, of a type preferably provided for use in subsonic flight. The gas turbine engine 10 generally includes in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. Some engine components may require lubricant to function. The gas turbine engine 10 includes a lubrication system 100 to feed (or circulate) lubricant to such engine components. Such components may include, for instance, accessory gearboxes, gear trains, or other components having lubricant within a housing and/or having lubricated moving interfaces (e.g. gears, bearings, etc.). The lubrication system 100 may be part of the aircraft engine 10, shown to be a turbofan, but the engine 10 may be a propeller engine, turbopropeller engine, a fan engine, a rotorcraft engine, among other possibilities. The lubrication system 100 may have one or more pumps 140, which may induce a flow of lubricant to these engine components of the gas turbine engine 10 that require lubrication. Just as those components mentioned above, the pump(s) 140 may also require lubrication, for instance between moving interfaces of pump parts (e.g. shaft mountings). The lubrication system 100 may also include additional components such as lubrication conduits that form a network of conduits, a lubricant reservoir, a de-aerator, valve(s), heat exchangers, filters, etc. An example of such lubrication system 100 is described hereinafter.

During engine service or inspection (e.g. boroscope inspection), access to internal features of the engine components may be required. Engine components providing an access to their internal features may be at risk of lubricant contamination or drainage, for instance where such access provides an open path between the internal features and the outside environment. Isolation of the internal features at risk of lubricant contamination from the open path to the outside environment may be desirable, in particular when lubricated moving interfaces are involved.

Figure 2:
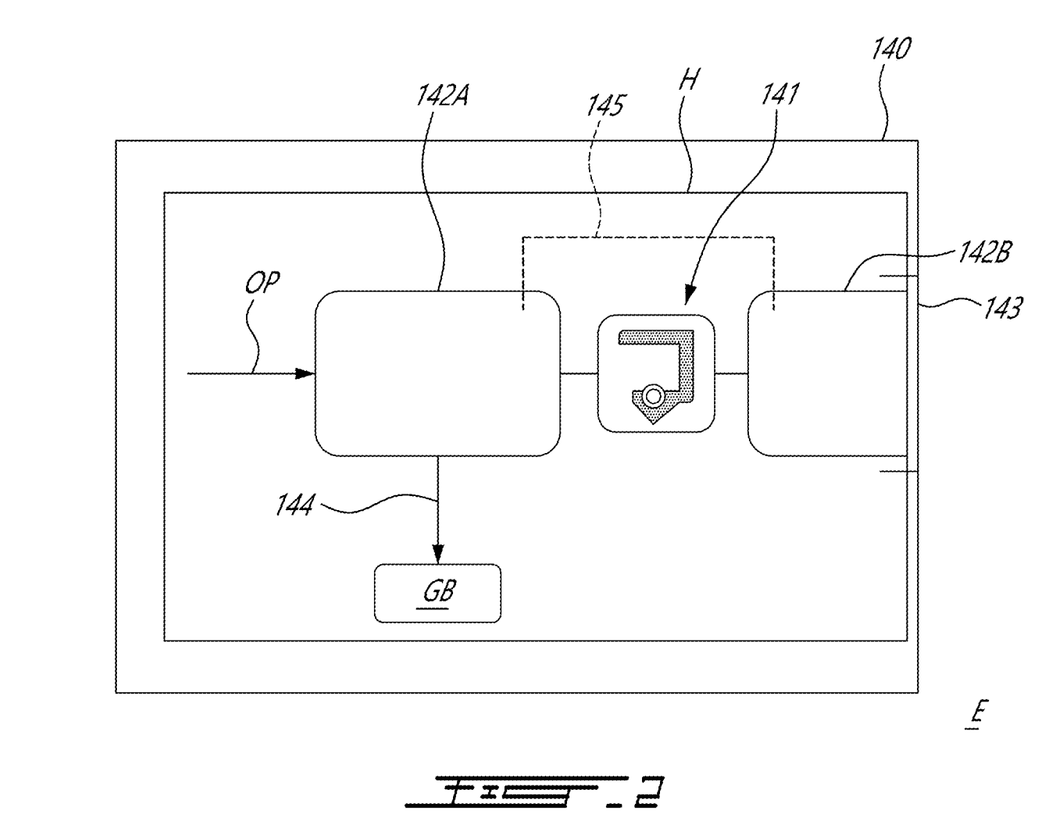
FIG. 2 is a schematic representation of a pump in accordance with an embodiment that may be used within the lubrication system of the aircraft engine of FIG. 1.

Referring to FIG. 2, a schematic representation of a sealing arrangement in an engine component having movable components with movable interface which may require lubricant is shown. The engine component taken as an example in the context of the present disclosure is one of such pump 140. The contents of the present disclosure may apply to other engine components, such as gearboxes (e.g.

accessory/auxiliary gearboxes) as another possibility. A seal 141 within one such pump 140 is illustrated. The pump 140 in an embodiment is an oil pump. The pump 140 includes a housing H enclosing the seal 141. The seal 141, for instance a lip seal, may limit or restrict fluid flow, for instance oil flow (or other lubricants) between two zones of the pump 140, which zones may take the form of cavities (cavities, internal volumes, hollow spaces . . . ) within the housing H, of the pump 140. As shown, the housing H of the pump 140 has two cavities 142A, 142B. The seal 141 is located between the two cavities 142A, 142B, such that oil from one of the cavities 142A, 142B may be blocked from flowing in the other one of the cavities 142A, 142B. The seal 141 may define a common partition (or wall) for the two adjacent cavities 142A, 142B in some embodiments.

The pump 140 defines an access in the form of a selectively openable port (or opening) in the housing H between the second cavity 142B and the environment E surrounding the pump 140. As shown, the pump 140 includes a cover 143 removably connected to a remainder of the pump housing H. If the cover 143 is removed from the pump housing H, for instance to access the internal volume of the cavity 142B, such cavity 142B may be opened to the environment E.

Oil (or other lubricants) may be received in the first cavity 142A via an oil path OP as a result of bearing oil leakage, scavenging or discharge of oil into the first cavity 142A via a lubricant channel, for instance. The first cavity 142A may be fluidly connected to a drainage passage 144 to drain oil (or excess oil) out of the cavity 142A. In the depicted embodiment, the drainage passage 144 is in fluid communication with a gearbox GB, here shown as part of the pump 140, though such gearbox GB may be separate from the pump 140 and drivingly engaged to the pump 140 in other cases. The drainage passage 144 may be in fluid communication with other parts of the engine 10, as described later.

In the pump 140, air may be trapped within cavities, such as cavities 142A, 142B, for instance in scavenge pumps receiving an air-oil mixture during operation, or because of air trapped during assembly of the pump 140 or installation of the cover 143 to close the access to the second cavity 142B. In operation, heat generation within the pump 140 may increase air pressure within one or more cavities (e.g. 142A, 142B). As such, an uneven air pressure build-up within the cavities 142A, 142B of the pump 140 located on opposite sides of the seal 141 may generate a pressure differential across the seal 141. Such pressure differential may be detrimental to the performance of the seal 141. For instance, a pressure differential across the seal 141 may result in seal distortion, or the seal 141 may undergo distress or wear, which may lead to leaks and/or accelerated wear of the seal 141 and reduce run time between required maintenance of the pump 140 (or other engine components, as applicable, that are lubricated). A vent channel 145 extends between the first and second cavities 142A, 142B. The vent channel 145 bypasses the seal 141. While the seal 141 may limit or restrict oil flow communication between the first and second cavities 142A, 142B, the vent channel 145 is adapted to balance the gas/air pressure across the seal 141. Such pressure balancing between the cavities 142A, 142B may occur when the cover 143 is removed to perform a maintenance or inspection, for instance. Exemplary vent channels 145 will be described with reference to the following figures. The vent channel 45 is one or more passages that may have different configurations to allow air to flow between cavities, such as the cavities 142A, 142B.

Figure 3:
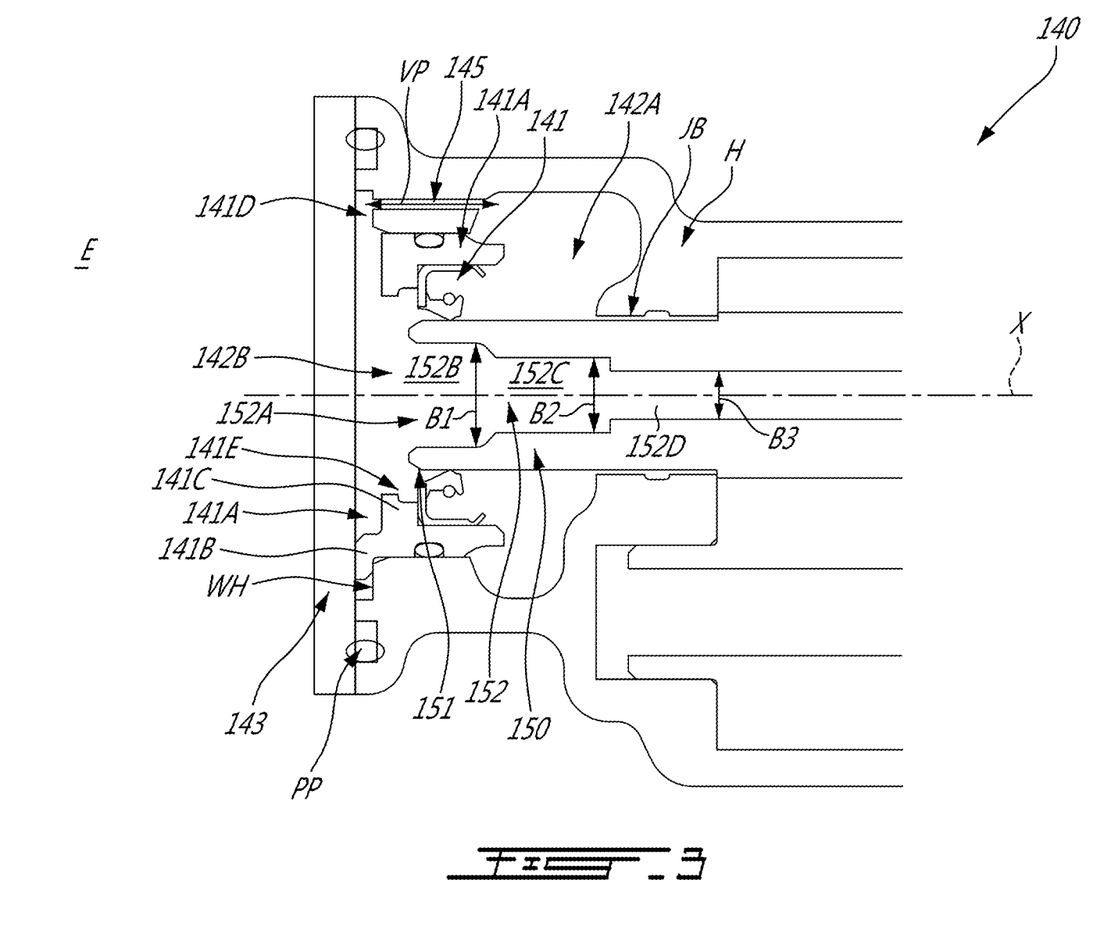
FIG. 3 is a cross-sectional view taken along axis X of a portion of a pump in accordance with an embodiment that may be used within the lubrication system of the aircraft engine of FIG. 1.

Referring to FIG. 3, the pump 140 includes a shaft 150 mounted for rotation about a rotation axis X within the housing H via one or more bearings, in this case journal bearing(s) JB. FIG. 3 only shows an end portion of the oil pump 140, showing one journal bearing JB; it should be understood that the shaft 150 may be rotatably supported via a plurality of journal bearings JB within the housing H. Roller or ball bearings may also be used in other examples of pump 140.

As shown, the seal 141 is mounted about the shaft 150. The seal 141 interfaces with a periphery of the shaft 150. The seal 141 is located between an axial end 151 of the shaft 150 and the journal bearing JB when viewed along the rotational axis X. In the depicted embodiment, the seal 141 is for instance a lip seal and may be of the spring seal type, though other types of seal, such as other mechanical seals, may be contemplated in other embodiments. As described above with respect to FIG. 2, now shown in FIG. 3, the seal 141 defines a common partition between two cavities. The seal 141 mounted about the shaft 150 forms a partition between the cavities 142A, 142B. In other words, the cavity 142A is on one side of the seal 141 and the cavity 142B is on the opposite side of the seal 141.

The first cavity 142A is a drain cavity (or lubricant cavity) defined along the shaft 150 between the seal 141 and the lubricated moving interfaces, in this case the journal bearing JB. The drain/lubricant cavity (or simply "cavity 142A") is adapted to receive lubricant leaking from the lubricated moving interfaces, here the journal bearing JB. In the depicted embodiment, the drain cavity 142A is annular and surrounds the shaft 150. Stated differently, the drain cavity 142A is defined circumferentially about the shaft 150. The drain cavity 142A may be only partially annular in other embodiments.

The second cavity 142B is a service (or "access") port cavity or crank port cavity, here bearing such name as a consequence of its relation with a cranking feature of the shaft 150 as will be described later. The service port cavity 142B is defined by a volume of the housing H axially between the seal 141 and the cover 143. As shown, the service port cavity 142B encloses at least the end 151 of the shaft 150. The end 151 (at least) of the shaft 150 is enclosed within the service port cavity 142B and/or in fluid communication therewith.

The seal 141 may thus be between the drain cavity 142A on an axial side and the service port cavity 142B on an opposite axial side along the shaft 150. Stated differently, the seal 141 may be between the service port cavity 142B and the moving interfaces, here journal bearing JB. The seal 141 may thus reduce the risk of oil leakage from the moving interfaces, here journal bearing JB, reaching the service port cavity 142B, which may be accessed during servicing. As shown, the seal 141 isolates the journal bearing JB from the service port cavity 142B. In such case, the seal 141 may prevent or limit penetration of contaminants from the outside environment E to the drain cavity 142A and/or to the journal bearing JB During service/inspection, when the cover 143 is removed to provide access to the service port cavity 142B, the journal bearing JB, may be physically isolated from contaminants or external contact. Limiting contaminants from mixing with the lubricant, or by extension the lubrication system 100, may be desirable. Boroscope inspections and manual cranking operations may thus be performed without emptying/draining the drain cavity 142A from its oil.

Air pressure across the seal 141, or stated differently between the drain cavity 142A and the service port cavity 142B may be balanced via the vent channel 145. As shown, the vent channel 145 defines a vent path VP between the drain cavity 142A and the service port cavity 142B. The vent channel 145 extends through a wall of the housing H, with such wall being a common wall (at least partially) between the drain cavity 142A and the service port cavity 142B. In other embodiments, the vent channel 145 may be defined through other wall(s), i.e. other than the wall of the housing H, for instance, as will be described with reference to other figures later.

The vent channel 145 is located at a higher elevation relative to the shaft 150 of the pump 140, with rotational axis X being generally horizontal when the gas turbine engine 10 featuring the pump 140 is in its parked or in its cruising orientation. In the depicted embodiment, the vent channel 145 has an opening 145A in the drain cavity 142A and an opening 145B in the service port cavity 142B. In the depicted embodiment, both openings 145A, 145B are located at a same elevation relative to the shaft 150 and/or rotational axis X, though this is optional. In some embodiments, for instance where the vent channel 145 extends straight from one opening 145A to the other opening 145B with such relative position of both openings 145A, 145B at the same elevation relative to the shaft 150 and/or rotational axis X, the vent channel 145 may be considered as a horizontal vent channel 145, though this depends on the spatial orientation/placement of the pump 140 in normal operating conditions within the engine 10.

In the depicted embodiment, the opening 145A of the vent channel 145 is located in a radial top half (or radialmost half portion) of the drain cavity 142A, more particularly here shown at a top-dead-centre position within the cavity 142A. A radial distance between the opening 145A of the vent channel 145 and the journal bearing JB may be maximized in some embodiments. In the depicted embodiment, the opening 145A of the vent channel 145 is at a greater radial distance from the shaft 150 than a radial distance of the seal 141 from the shaft 150. At least part of the vent channel 145 is located radially above the seal 141. Such location may correspond to a position of the vent channel 145 on a radially opposed side of the shaft 150 (or seal 141) from the drain passage 144 discussed above. Such location may also correspond to a position radially above a lubricant resting line. A lubricant resting line may be defined as a maximum level of lubricant within the drain cavity 142A during normal operating condition of the engine 10, or after the engine 10 is shut down and prior to servicing, should the drain passage 144 not draining the content of the cavity 142A in such situations. It is to be understood that "top" and "above" in the present context refer to the relative position of the seal 141 and/or shaft 150 and the vent channel 145 when the pump 140 is installed within the engine 10 in its normal operating conditions and orientation. For instance, if the engine 10 were to be oriented upside down relative to the gravitational force, the vent channel 145 could be said to be below the seal 141. Such orientation would be detrimental to the function of the vent channel 145, as oil from the drain cavity 142A could be retained in the vent channel 145 and/or leak through the vent channel 145 into the service port cavity 142B, which would not be desirable and/or would go against a purpose of the seal 141 arrangement with inter cavity vent discussed herein.

In the depicted embodiment, a seal retainer 141A between the seal 141 and the housing H. As shown, the seal retainer 141A interfaces with the seal 141 and the housing H. The seal retainer 141A is adapted to secure the seal 141 axially and/or radially between the housing H and the shaft 150. The seal retainer 141A may include a O-ring (or gasket, or other seal) to interface with the housing H, though this is optional.

In the depicted embodiment, the seal retainer 141A defines a tab 141B or flange extending at least partially radially with respect to a remainder of the seal retainer 141A. As shown, the tab 141B extends radially outwardly relative to the rotational axis X. When the seal retainer 141A is installed within the housing H, the tab 141B may abut against the cover 143 and an opposite wall WH of the housing H. As such, when the cover 143 is secured to the housing H, the tab 141B is sandwiched between the cover 143 and such wall WH of the housing H. The tab 141B may be annular, fully or partially. The tab 141B may be discontinuous circumferentially at one or more portions thereof. As can be seen in the cross-section of FIG. 3, the tab 141B is not visible in the top half portion of the figure. The seal retainer 141A includes a volume 141D (e.g., slot or groove) adapted to allow air flow communication between the vent channel 145 and the service port cavity 142B. Such volume 141D is defined by a circumferentially discontinuous portion of the tab 141B, with such discontinuous portion generally aligned with the vent channel 145 in the cross-section shown. The volume 141D may be shaped and/or positioned differently relative to the vent channel 145 in other embodiments.

The seal retainer 141A may define another tab 141C extending radially from a remainder of the seal retainer 141A. The tab 141C may be annular, fully or partially. The tab 141C may be discontinuous circumferentially at one or more portions thereof. As shown, the tab 141C extends radially inwardly relative to the rotational axis X. When the seal 141 and the seal retainer 141A are installed within the housing H, the tab 141C may abut axially against a side of the seal 141, thereby hindering axial movement of the seal 141 in a direction opposing the tab 141C. If a pressure differential were to build up across the seal 141 with more pressure on the side of the drain cavity 142A as opposed to the side of the service port cavity 142B, such pressure differential could induce an axial force on the seal 141, which could be opposed by the tab 141C. The tab 141C is optional in some embodiments where the seal 141 and/or the seal retainer 141A are secured by friction (friction fit, tight fit, interference fit, etc.), without the optional tab 141C.

In some embodiment, such as shown, the tab 141C may include a pulling feature 141E adapted to interact with a pulling tool (not shown), which may facilitate extraction of the seal retainer 141A from the housing H for maintenance or replacement, for instance. The pulling feature 141E in the depicted embodiment is a protrusion extending radially inwardly from a remainder of the tab 141C. As shown, a gap is defined between a wall of the pulling feature 141E and an oppositely facing wall of the seal 141. Because of the tight fit relationship between the seal retainer 141A and the housing H (or O-ring providing the sealing and the tight fit), the seal retainer 141A may require pulling force for extraction from the housing H. Such pulling feature 141E may not be present in other embodiments.

Air passages other than a slot (141D) type passage may be defined through part of the seal retainer 141A in other embodiments to allow fluid flow communication between the vent channel 145 and the service port cavity 142B, where the seal retainer 141A is present. For instance, a channel may be defined through the tab(s) 141B, 141C or other portion(s) of the seal retainer 141A, or through a groove in the cover 143, to define a flow path connected to the vent channel 145. The seal retainer 141A may also have more than one air passage fluidly connected to the vent channel 145. Stated differently, the vent channel 145 may extend partially through the tab(s) 141B, 141C or other portion(s) of the seal retainer 141A, or through a groove in the cover 143 in addition to or instead of extending in a wall of the housing H. This may be the case whether or not there are multiple vent channels 145 depending on the embodiments, for instance. The seal retainer 141A may be without a tab 141B for example, with the seal retainer 141A fixed axially to the housing H by threading, by a circlip, etc.

Other embodiments of the seal 141 and/or embodiments of the housing H may not require such seal retainer 141A, depending on the configuration of the seal 141 and/or of the housing H.

The cover 143 interfaces with the housing H. As shown, the cover 143 forms a wall of the service port cavity 142B. The cover 143 faces the axial end 151 of the shaft 150 (or vice versa). A space between the cover 143 and the axial end 151 of the shaft 150 forms part of the service port cavity 142B. The cover 143 may be removably secured to the housing H in various ways. For instance, it may be fastened or otherwise removably secured to the housing H. In the depicted embodiment, a preformed packing PP or like sealing device (e.g., O-ring or like seal) is located between the cover 143 and the housing H. Such preformed packing may contribute to the sealing of the service port cavity 142B when the cover 143 is secured to the housing H. The preformed packing may create suitable sealing capabilities of the cover 143 in place. The preformed packing and the cover 143 may lead to an increase of the air pressure trapped between the seal 141 and the cover 143 during operation, for instance as a consequence of a temperature increase within the pump 140. Such air pressure build up, air expansion, and/or subsequent temperature decrease of the trapped air may detrimentally affect the performance of the seal 141 if not properly controlled. For instance, the seal 141 may suffer from seal distortion, which may lead to wear and/or loss in efficiency of the seal 141 over time. The vent channel 145 may contribute to maintain a proper performance of the seal 141 in such situation. Other embodiments may not have such preformed packing PP and still provide sealing capabilities between the cover 143 and the housing H.

Having the cavities connected for air flow communication by the vent channel 145 may allow a temperature increase of the air trapped within the service port cavity 142B at a constant (or near constant) pressure, which may reduce and/or regulate the induced radial and axial forces on the seal 141. The drainage passage 144 may allow this, as air trapped within the service port cavity 142B may flow to the drain cavity 142A and expand towards the drainage passage 144 in fluid communication with a larger internal volume of another component of the engine 10 (e.g. gearbox GB, or other components), for instance.

The vent channel 145 is in a normally opened state during operation of the pump 140 to allow the pressure balancing discussed above, in some embodiments. The normally opened state may be defined as an unobstructed state (by other parts of the pump 140 for instance) of the vent channel 145 during operation of the pump 140. As will be described later, other embodiments may have a vent channel 145 that is normally closed/obstructed and selectively openable/releasable under certain threshold conditions. Yet, as described later, the vent channel 145 may, in some embodiments, be closed (manually or via a closing mechanism, such as an actuator) when the cover 143 is removed from the housing, for maintenance of the pump 140 for instance. A check valve may be in/on the vent channel 145 as another possibility.

The vent channel 145 may have various shapes depending on the embodiments. In an embodiment, as shown, the vent channel 145 is a straight channel. The vent channel 145 extends axially along the rotational axis X, without circumferential direction component. In other words, the vent channel 145 extends entirely along a radial plane from one opening 145A to the other opening 145B. In some embodiments, the vent channel 145 may have a circumferential direction component. For instance, the vent channel 145 may be circumferentially skewed between the openings 145A, 145B.

In the depicted embodiment, the vent channel 145 has a constant bore size. The vent channel 145 may not be straight, i.e. it may be curved, or at least in part not straight, and/or the vent channel 145 may have a divergent, convergent, or both convergent-divergent shape in other embodiments, for instance. The vent channel 145 may be in the form of a slot or may have other shapes. In the depicted embodiment, the vent channel 145 has a single opening 145A on the drain cavity side and a single opening 145B on the service port cavity side. The vent channel 145 may have more than one opening 145A on the drain cavity side and/or more than one opening 145B on the service port cavity side as some other possibilities. The vent channel 145 may be a network of sub-channels interconnected together, merging (or not) into one (or both) of the opening(s) 145A, 145B in some embodiments.

There may be more than one vent channel 145 in some embodiments, though a single vent channel 145, such as shown, may suffice.

With continued reference to FIG. 3, the shaft 150 includes a cranking feature 152. The cranking feature 152 is adapted to allow manual winding of the pump 140 and/or of the power source (not shown) drivingly connected to the pump 140 during downtime, maintenance, or other situations requiring the opening of the housing H to gain access to its internal components and/or requiring the inducement of manual motion to components of the pump 140. For instance, the cranking feature 152 may be adapted to connect or otherwise interface with a tool, which may be referred to as a hand crank in some embodiments, a drill or like power tool, operable to rotate the shaft 150, thereby allowing motion of the movable components of the pump 140 and motion of parts of other engine components drivingly connected to the pump 140 (e.g. gear train, compressor, turbine, etc.) while the pump 140, and such other engine components are non-operational. The cranking feature 152 may facilitate boroscope inspections of the engine 10.

The cranking feature 152 is accessible from the environment E via the service port cavity 142B when the cover 143 is removed. In the depicted embodiment, the cranking feature 152 is defined inside the shaft 150 and extends therethrough over at least part of the shaft length (at least part, or along the entire length of the shaft 150, depending on the embodiments). In other words, the shaft 150 has a hollow portion defined at the end 151 of the shaft 150. The hollow portion defines the cranking feature 152. The cranking feature 152 may be an hexagonal hole a square section hole, a splined hole, among possibility, for the hand crank or like tool to couple to the shaft 150 for concurrent rotation. As shown, the cranking feature 152 defines a port 152A opened to the service port cavity 142B. The port 152A extends axially along the rotational axis X from the end 151 of the shaft 150. In the depicted embodiment, the shaft 150 is hollow over part of its length such as to define such port 152A. In an embodiment, the port 152A is not hydraulically connected to any other part of the pump 140 or engine 10 such that the only communication between the cavities 142A, 142B is through the vent channel 145. The port 152A may have a number of sections 152B, 152C, 152D having different bore sizes B1, B2, B3 in some embodiments, such as shown. The port 152A has a first bore size B1 from the axial end 151 of the shaft 150 toward an opposite axial end thereof. The port 152A defines a constriction from the section 152B having the first bore size B1, such as to have a second bore size B2 smaller than the first bore size B1 in a section adjacent section 152C of the port 152A. Likewise, the port 152A further constricts from the section 152C, such as to define a third bore size B3 smaller than the second bore size B2 in the section 152D adjacent the section 152C. Other shapes for the port 152A may be contemplated in other embodiments, including a single inner diameter for the port 152A along the shaft 150.

Part of the service port cavity 142B may be defined by the crank port 152A, as both the crank port 152A and the service port cavity 142B may form a common hollow space without delimited boundary between them. In other words, the crank port 152A in the depicted embodiment is open to the service port cavity 142B at the axial end 151 of the shaft 150. In some embodiments, the crank port 152A may be isolated from the service port cavity 142B, for instance by a closure member blocking access to the crank port 152A via the service port cavity 142B (e.g. cap removably secured to the axial end 151 of the shaft 150, a removable plug, or other obstructing element).

Figure 4:
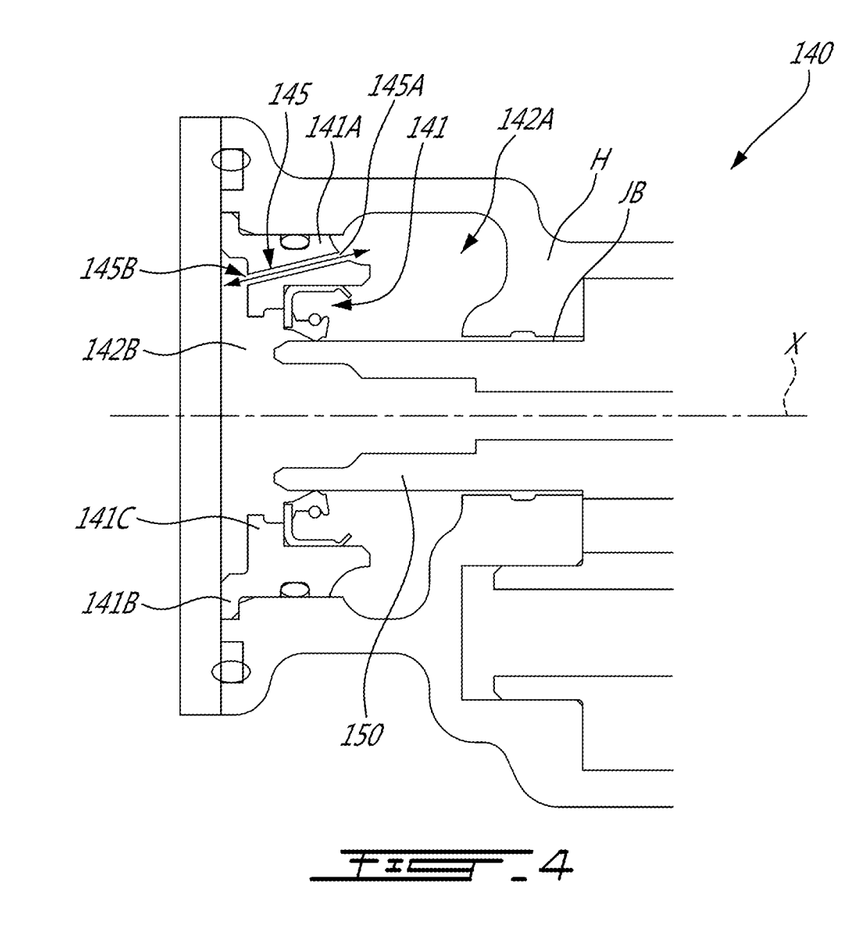
FIG. 4 is a cross-sectional view taken along axis X of a portion of the pump of FIG. 3, in accordance with another embodiment.

Referring to FIG. 4, a portion of another exemplary pump 140 is shown. For simplicity, similar features than those discussed above will keep the same reference numbers. For sake of conciseness, only the features not already described above will be discussed with respect to this other embodiment shown. It should be understood that the features described above equally apply to the embodiment shown in FIG. 4, unless disclosed otherwise. In the depicted embodiment, the pump 140 has a seal 141 retained axially within the housing H via a seal retainer 141A. The seal 141 is disposed radially between the shaft 150 and the seal retainer 141A. In the depicted embodiment the seal retainer 141A defines a vent channel 145 extending through it. As shown, the vent channel 145 defines a flow path between the drain cavity 142A and the service port cavity 142B.

In the depicted embodiment, the vent channel 145 has an opening 145A in the drain cavity 142A and an opening 145B in the service port cavity 142B, with the opening 145B in the service port cavity 142B at a radially inward position relative to the opening 145A in the drain cavity 142A. As shown in FIG. 4, the vent channel 145 has a radial direction component that extends radially inwardly from the opening 145A in the drain cavity 142A towards the opening 145B in the service port cavity 142B. This angled orientation of the vent channel 145 in a radial plane incorporating the rotational axis X (i.e., plane of the sheet of FIG. 4) may reduce excess oil leakage from the drain cavity 142A to the service port cavity 142B, if the level of oil were to rise at a level equal to or slightly above the seal 141 within the drain cavity 142A. Such angled orientation may allow positioning of the opening 145A of the vent channel 145 in a radial top half of the drain cavity 142A. A radial distance between the opening 145A of the vent channel 145 and the journal bearing JB may thus be maximized in some embodiments.

In a particular embodiment, such as shown, the vent channel 145 extends from one side to the other of the seal retainer 141A, without extending through either one of the tabs 141B, 141C or flanges. This may be different in other embodiments, for instance where the geometry of the seal retainer 141A is different, e.g. without tabs, and/or does not allow such arrangement of the vent channel 145, as some possibilities. Having the vent channel 145 through the seal retainer 141A as opposed to having the vent channel 145 defined through a wall of the housing H (as in previously discussed embodiments above) may facilitate manufacturing of the pump housing H. This may also allow retrofitting the seal 141 with vented seal retainer 141A in some pumps not initially envisioned with such vented seal arrangement, i.e. without vent channel machined through their housings.

Figure 5:
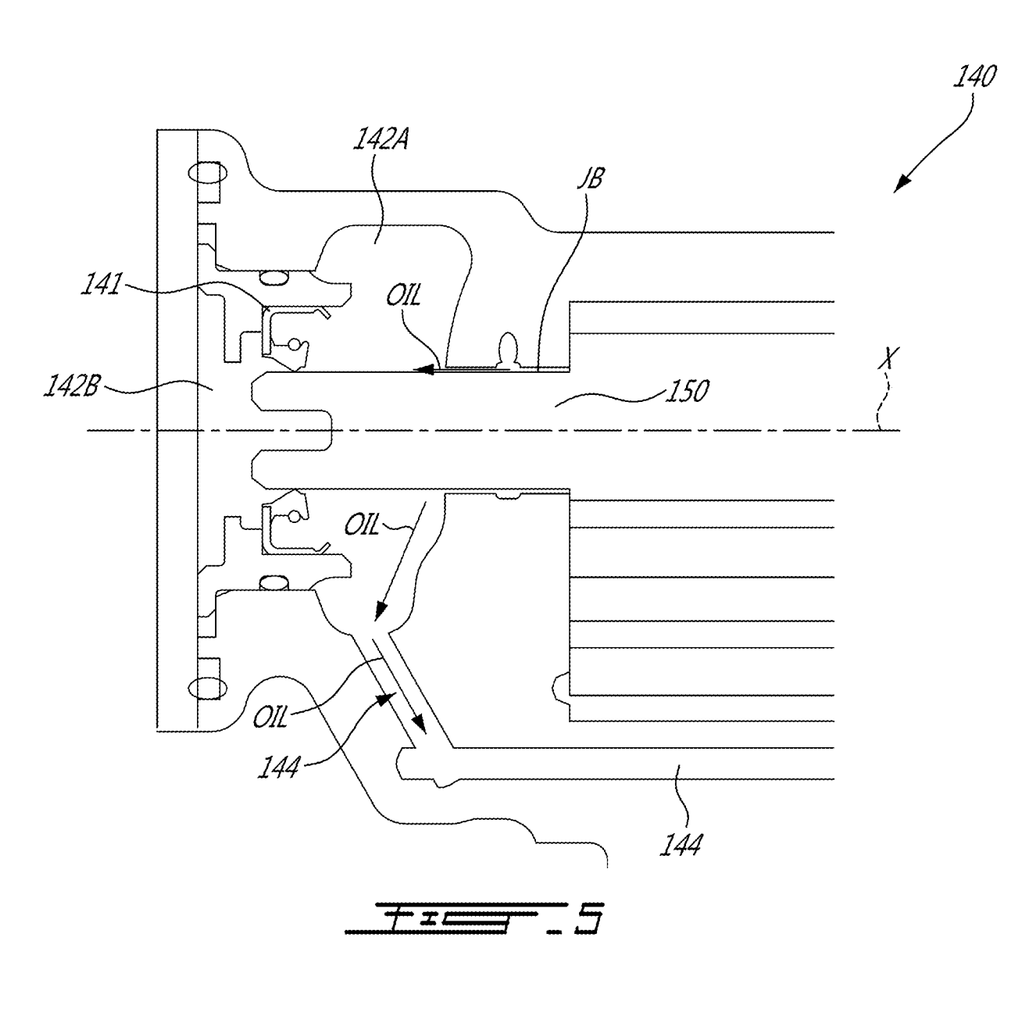
FIG. 5 is another cross-sectional view taken along axis X of a portion of the pump of FIG. 3, viewed in a different plane than that of FIG. 3, in accordance with an embodiment.

Referring to FIG. 5, there is shown another cross-sectional view in accordance with at least some embodiments of the pump 140 discussed above. For simplicity, similar features than those discussed above will keep the same reference numbers. For sake of conciseness, only the features not already described above will be discussed with respect to this other embodiment shown. It should be understood that the features described above equally apply to the embodiment shown in FIG. 5, unless disclosed otherwise. As shown, the pump 140 has a drainage passage 144, as discussed earlier with respect to FIG. 2, in a lower half portion of the drain cavity 142A, or below the shaft 150 when viewed in this orientation of the pump 140. The drain passage 144 may be present in at least some embodiments, including those discussed above. During operation of the pump 140, oil may flow or leak from the journal bearing(s) JB. The oil leaking from the journal bearing JB may come out from the journal bearing JB inside the drain cavity 142A. The seal 141 may limit or block oil from flowing in the service port cavity 142B along the shaft 150. The drain passage 144 is in fluid flow communication with the drain cavity 142A. The drain passage 144 is defined through a wall of the housing H. Portions of the drain passage 144 may be defined through other parts of the aircraft engine, such as through a tubing section and/or a gearbox housing in some embodiments.

In the depicted embodiment, the drain passage 144 has a portion that extends parallel to the shaft 150. The drain passage 144 may exit the housing H at an opposite extremity thereof to join other parts of the lubrication system 100. The drain passage 144 may be fluidly connected to a gearbox of the engine 10, as a possibility. The drain passage 144 may allow excess oil to be drained out of the drain cavity 142A, as illustrated by the arrows OIL in FIG. 5, to a remote location, which may be a component of the lubrication system 100 or other components of the engine 10 or the pump 140 (e.g. gearbox GB, as shown in FIG. 2).

In the depicted embodiment, the drainage passage 144 is located radially outward of the drain cavity 142A relative to the rotational axis X. Excess oil inside the drain cavity 142A may exit through the drainage passage 144 via gravity, in embodiments where the pump 140 is mounted within the aircraft engine 10 in an orientation such that the drainage passage 144 is located at a lower elevation, in whole or in part, relative to the drain cavity 142A in normal operating conditions and orientation of the aircraft engine 10, and/or exit through the drainage passage 144 under pressure. Only one drainage passage 144 is shown in the pump 140 of FIG. 5, though more than one drainage passage 144 may exist, depending on the embodiments.

Figure 6:
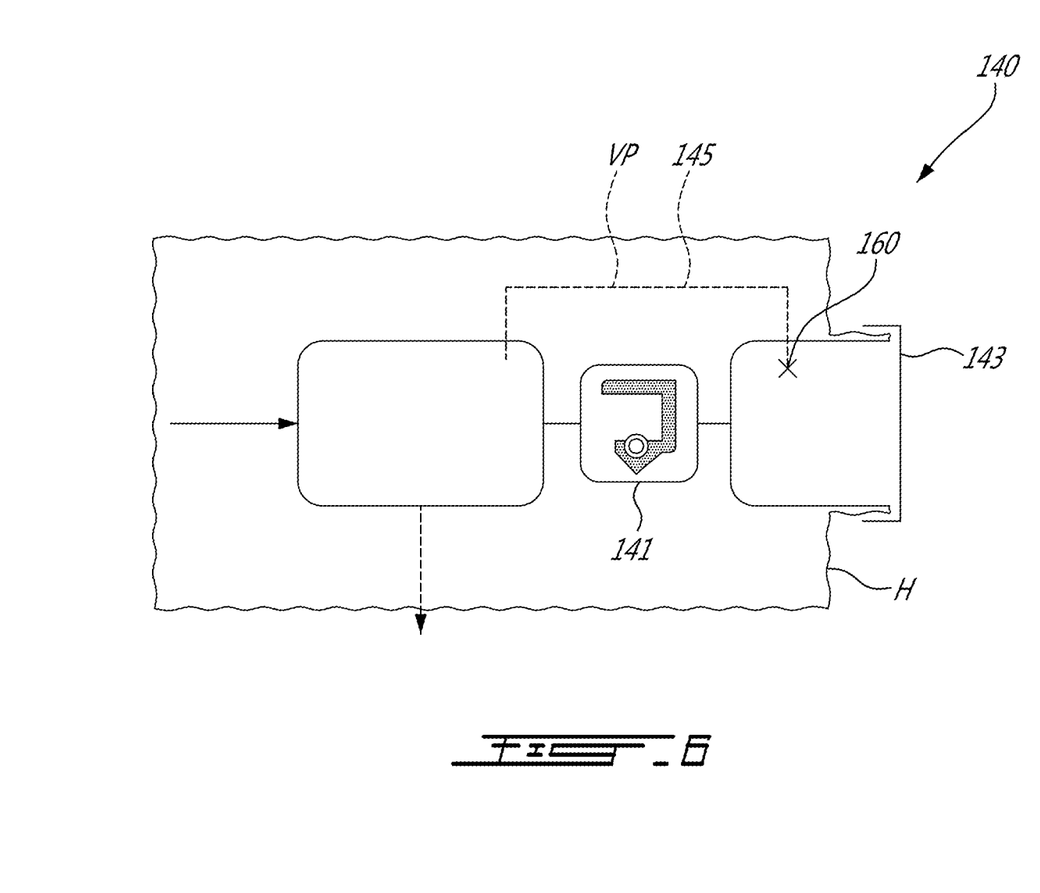
FIG. 6 is a schematic representation of a pump as in FIG. 2, in accordance with another embodiment.
Figure 7:
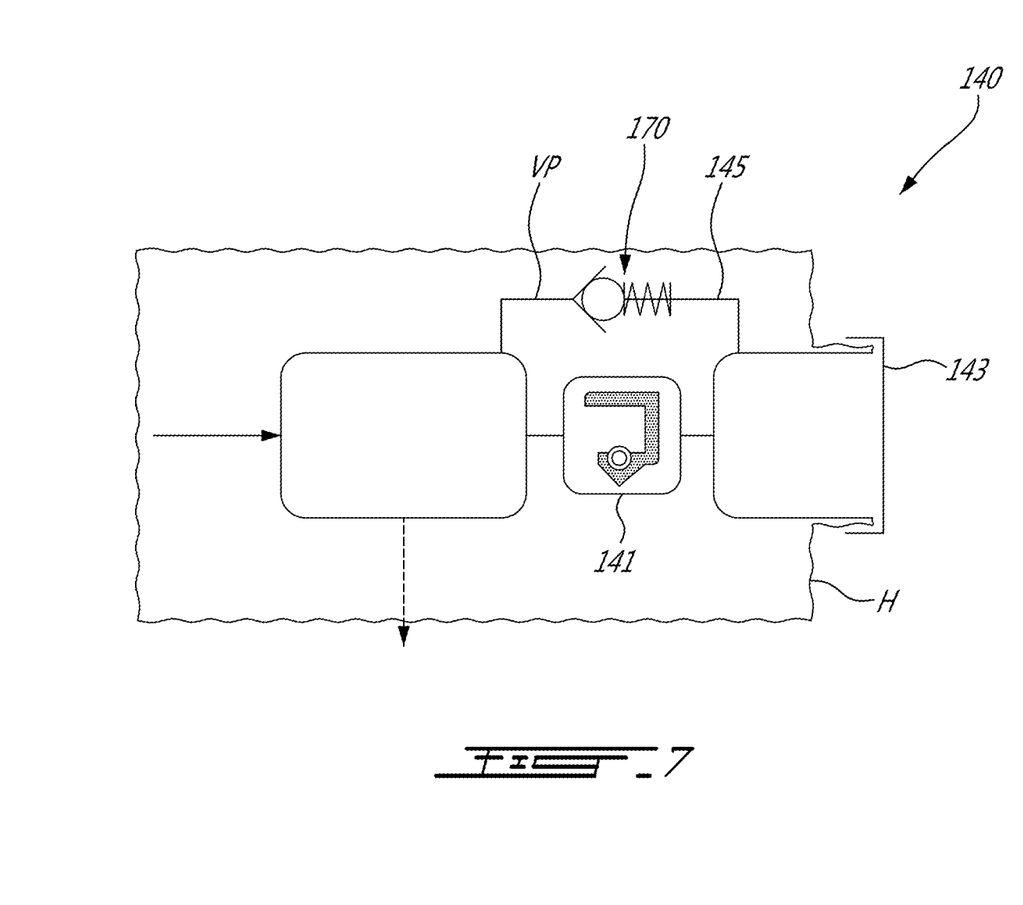
FIG. 7 is a schematic representation of a pump as in FIGS. 2 and 6, in accordance with another embodiment.
Figure 8:
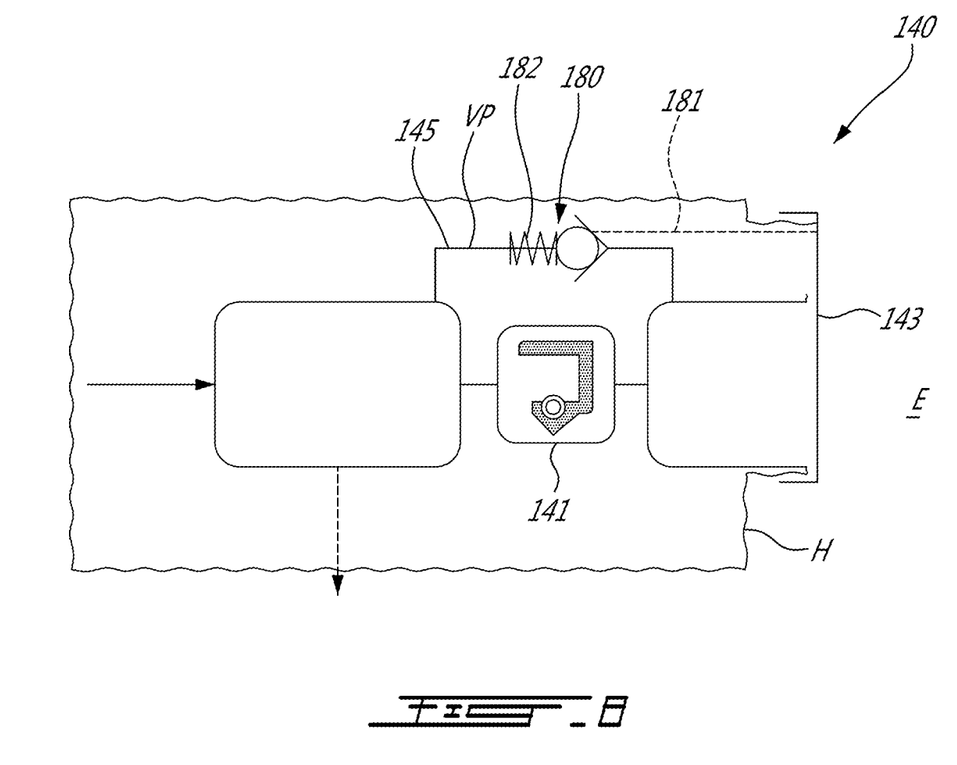
FIG. 8 is a schematic representation of a pump as in FIGS. 2, 6-7, in accordance with another embodiment.

Referring to FIGS. 6-8, there are shown alternate embodiments of the vented seal arrangement.

In FIG. 6, there is schematically shown a plug 160, which may be other types of closure members in other embodiments, securable to the vent channel 145 to block the vent path VP. For instance, the plug 160 may be manually secured to the vent channel 145 when the cover 143 is removed from the housing H during maintenance, for instance. As such, the plug 160 may prevent or limit oil leakage via the vent channel 145 during use of the crank port (not shown in this figure, see previous figures), such as during pump/engine inspections. One drawback of having such manually securable plug 160 may be that the plug 160 or other components of the pump 140 may require mistake proofing features to ensure the plug 160 is removed after maintenance and before the cover 143 is secured back to the housing H to have the vent path VP opened during operation of the pump 140. The plug 160 may be integrated to the cover 143, such that, when the cover 143 is removed the plug 160 may be removed, and when the cover 143 is secured to the housing H, the plug 160 on the cover 143 may close the vent channel 145.

As shown in FIG. 7, a check valve 170 may be installed within the vent channel 145 or otherwise fluidly connected to the opening, which would here be the service port cavity side opening 145B of the vent channel 145 discussed with respect to previous figures. The check valve 170, in this embodiment, may be in a normally closed state during operation of the pump 140 under normal conditions. In other words, the check valve 170 may selectively obstruct (fully or partially) the vent channel 145. The check valve 170 may be a pressure valve. The pressure valve may include a spring sized or designed to shorten or open the valve at a selected pressure differential which would distort the seal 141 or which would undergo distress or wear of the seal 141. As such, the check valve 170 may remain closed during pump/engine inspections and requires no additional safety measures to ensure the vent channel 145 is operable during normal operating conditions of the pump 140.

In FIG. 8, the check valve 180 is a mechanically opened check valve installed within (within or "on") the vent channel 145, or which may be otherwise fluidly connected between the cavities 142A, 142B, as other possibilities. The check valve 180 may be in a normally opened state during operation of the pump 140 under normal conditions. For instance, the check valve 180 may have an actuator 181, such as a pin or a stem, having a portion (e.g. end) cooperating with (e.g. pressed on by) the cover 143 when the cover 143 is installed on the pump 140. The presence of the cover 143 may activate the check valve 180 via interaction with the actuator 181 such as to force the check valve 180 to remain in an opened state during operation of the pump 140. The check valve 180 may include a spring or other biasing member 182 configured to close the check valve 180 upon removal of the cover 143. As such, sealing of the vent channel 145 may be obtained during maintenance of the pump 140 with the service port cavity 142B left opened to the outside environment E without additional precaution to be taken by the user to limit contaminants to enter into the drain cavity 142A and contaminate lubricant of the journal bearing JB and/or lubrication system (example described below).

Figure 9:
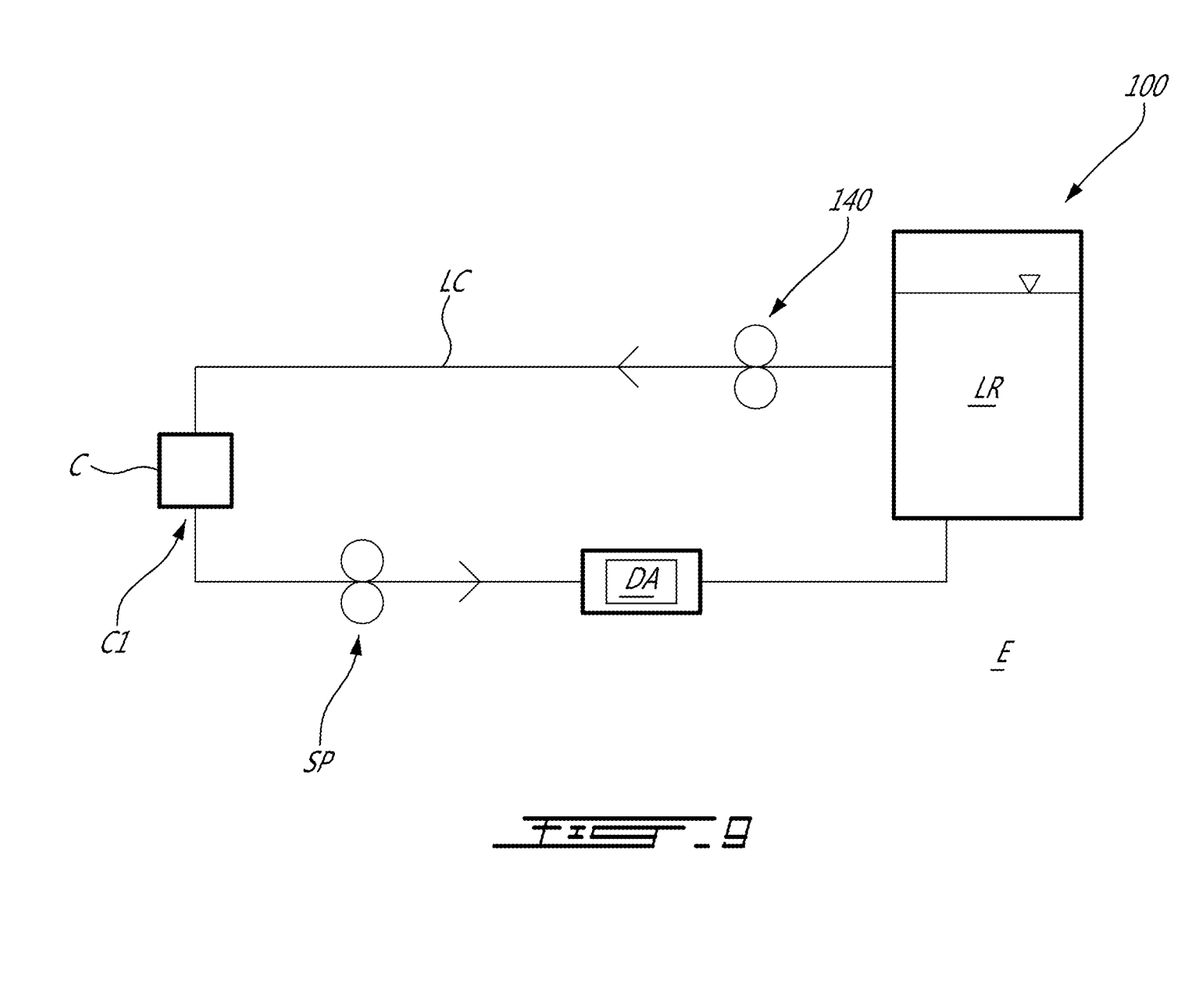
FIG. 9 is a schematic view of an example of the lubrication system used with the aircraft engine of FIG. 1.

Referring to FIG. 9, an example of the lubrication system 100 is shown. The lubrication system 100 includes at least one pump 140 as described above with respect to various embodiments. The lubrication system 100 includes lubrication conduits LC that form a network of conduits and a lubricant reservoir LR, The lubricant reservoir LR is hydraulically connected to one or more components C of the engine 10 in need of lubrication, such as, for instance, bearing cavity(ies), gearbox(es), and so on. The pump 140 is operable to induce a flow of the lubricant from the lubricant reservoir LR, to the one or more components C of the engine 10 in need of lubrication. Although not depicted in FIG. 9, the lubrication system 100 may also include additional components such as valve(s), heat exchangers, filters, etc. In some cases, for instance when the component C is a bearing cavity, the oil may flow through the bearing cavity and may be mixed with compressed air injected therein for pressurizing the bearing cavity. The oil mixture exiting the bearing cavity may thus have a greater air content than the oil mixture entering the bearing cavity. A scavenge pump(s) SP, among other pump types, may be present and is operable to draw a scavenge flow of oil back to the reservoir LR. Features of the pump 140 described above, such as the vented seal arrangements discussed above, may be applicable to the scavenge pump SP illustrated herein. The scavenge pump SP has an inlet hydraulically connected to a scavenge outlet C1 of the component C and an outlet hydraulically connected to a de-aerator DA. The de-aerator DA, if present, may be operable to remove at least a portion of the air contained within the air-oil mixture it receives before flowing the oil back to the one or more components C in need of lubrication, or simply back to the reservoir LR.

The above description is meant to be exemplary only, and one skilled in the art will recognize that changes may be made to the embodiments described without departing from the scope of the invention disclosed. For example, in some embodiments, although not shown, the seal 141 may have a vent hole/channel extending through its body, instead of, or in addition to having the vent channel(s) 145, 145 in the seal retainer 141A or the housing H.

There may be a series of seals axially aligned along the shaft 150 adjacent the end 151 of such shaft 150, instead of having a single seal as discussed above. Yet, any other types of seal, such as used for internal seals of the pump 140 or gearbox, such as accessory or auxiliary gearbox, may be contemplated in addition to or instead of the seal 141 described herein to achieve proper sealing of the drain cavity 142A.

While the present disclosure refers to a pump, the sealing arrangement with inter cavity vent described herein may apply to any other engine components having a cranking feature and drain/lubricant cavity(ies), such as an accessory or auxiliary gearbox (AGB), as one possibility. Such AGBs may include lubricant cavitie(s) (and lubricated moving interfaces) and service port cavitie(s), seal(s), shaft(s), drainage passage(s), etc., such as that discussed above in the context of the pump 140. As another possibility, the sealing arrangement is provided for a gear box featuring a cranking feature on its idler gear(s).

While the present disclosure referred to a gas turbine engine of the turbofan type, the sealing arrangement and vent disclosed herein may apply to turboprop engines, helicopter engines or other types of aircraft engines.

Still other modifications which fall within the scope of the present invention will be apparent to those skilled in the art, in light of a review of this disclosure, and such modifications are intended to fall within the appended claims.

The invention claimed is:

1. An apparatus for an aircraft engine, comprising:
a housing;
a shaft rotatably supported for rotation about a rotation axis within the housing;
a seal mounted about the shaft and interfaced to the shaft, the seal having a first side and a second side;
a lubricant drain cavity on the first side of the seal, the lubricant drain cavity adapted to receive lubricant from a lubricated moving interface of the apparatus;
an access port cavity on the second side of the seal;
a vent channel extending between the lubricant drain cavity and the access port cavity for fluid flow communication between the lubricant drain cavity and the access port cavity so as to balance air pressure across the seal, the vent channel having a valve for selectively obstructing the vent channel; and a cranking feature in the shaft, the cranking feature accessible via the access port cavity.

2. The apparatus as defined in claim 1, wherein the seal forms part of a common wall of the lubricant drain cavity and of the access port cavity on the second side of the seal.

3. The apparatus as defined in claim 2, wherein the vent channel is defined through a wall of the housing.

4. The apparatus as defined in claim 2, further comprising a seal retainer interfacing between the housing and the seal, the seal retainer adapted to abut axially against the seal.

5. The apparatus as defined in claim 4, wherein the vent channel is defined at least partially through the seal retainer.

6. The apparatus as defined in claim 5, wherein the seal retainer includes a tab extending radially from a remainder of the seal retainer, a slot defined through the tab allowing fluid flow communication between the vent channel and the access port cavity on the second side of the seal.

7. The apparatus as defined in claim 1, wherein the cranking feature of the shaft is a port defined in an end of the shaft, the port being opened to the access port cavity.

8. The apparatus as defined in claim 1, further comprising a cover removably connected to the housing, the cover forming a wall of the access port cavity for enclosing at least an end of the shaft in the access port cavity.

9. The apparatus as defined in claim 8, wherein the valve has an actuator cooperating with the cover, to selectively open the valve during operation of the apparatus.

\* \* \* \* \*